United States Patent
Govindarajan et al.

(10) Patent No.: US 10,181,066 B2
(45) Date of Patent: Jan. 15, 2019

(54) SMART HARBOR DEVICE FOR INTELLIGENT UPDATING AND SELECTION FOR USE OF TRANSACTION PROCESSING TERMINAL DEVICES

(71) Applicant: PAYPAL, INC., San Jose, CA (US)

(72) Inventors: Satish Govindarajan, Los Altos, CA (US); Geoffrey William Chatterton, Santa Clara, CA (US); Gunabalan Babu, Fremont, CA (US); Guhan Senguttuvan, San Jose, CA (US); Anantharaj Uruthiralingam, Santa Clara, CA (US); Khiem Pham, Pleasanton, CA (US); Carlos Rivas, Redwood City, CA (US)

(73) Assignee: PAYPAL, INC., San Jose, CA (US)

(*) Notice: Subject to any disclaimer, the term of this patent is extended or adjusted under 35 U.S.C. 154(b) by 98 days.

(21) Appl. No.: 15/174,679

(22) Filed: Jun. 6, 2016

(65) Prior Publication Data
US 2017/0351889 A1    Dec. 7, 2017

(51) Int. Cl.
*G06K 7/10*      (2006.01)
*G06F 8/65*      (2018.01)

(52) U.S. Cl.
CPC ........... *G06K 7/10465* (2013.01); *G06F 8/65* (2013.01)

(58) Field of Classification Search
CPC ..... G06F 8/60; G06F 8/61; G06F 8/65; G06F 8/66; G06F 8/665; G06F 8/68; G06F 8/70
USPC .................................................. 717/168–178
See application file for complete search history.

(56) References Cited

U.S. PATENT DOCUMENTS

| | | | | |
|---|---|---|---|---|
| 5,933,812 A * | 8/1999 | Meyer | ..................... | G06Q 20/20 235/380 |
| 6,845,363 B1 * | 1/2005 | Matsubara | ............. | G06Q 20/20 705/16 |
| 7,971,782 B1 * | 7/2011 | Shams | ................... | G06Q 20/20 235/379 |
| 8,214,558 B1 * | 7/2012 | Sokolov | .................. | G06F 21/50 710/39 |
| 8,910,868 B1 * | 12/2014 | Wade | ................... | G06K 7/0095 235/449 |
| 9,569,196 B2 * | 2/2017 | Das | .......................... | G06F 8/65 |
| 9,778,928 B1 * | 10/2017 | Steshenko | ................ | G06F 8/44 |

(Continued)

*Primary Examiner* — Andrew M. Lyons
(74) *Attorney, Agent, or Firm* — Haynes and Boone, LLP

(57) ABSTRACT

There are provided systems and methods for a smart harbor device for intelligent updating and selection for use of transaction processing terminal devices. A smart harbor device may be used to provide updating, servicing, and other maintenance of transaction processing terminal devices, such as EMV terminals used in retail transaction processing. The smart harbor device may include a port where the transaction processing terminal devices may be places, and the smart harbor device may connect to each of the transaction processing terminal devices. Once connected, the smart harbor device may run diagnostics to determine the statuses and conditions for each of the transaction processing terminal devices and maintenance the transaction processing terminal devices. The maintenance may be performed at times where the transaction processing terminal devices are not required for use. Additionally, the smart harbor device may intelligently select one based on statuses and device capabilities.

20 Claims, 6 Drawing Sheets

(56) References Cited

U.S. PATENT DOCUMENTS

| | | | | |
|---|---|---|---|---|
| 2007/0055574 A1* | 3/2007 | Jensen | G06Q 20/209 | 705/24 |
| 2008/0189693 A1* | 8/2008 | Pathak | G06F 8/65 | 717/168 |
| 2010/0008003 A1* | 1/2010 | Chen | H01L 27/0251 | 361/56 |
| 2010/0042671 A1* | 2/2010 | Natt | H04M 1/06 | 709/203 |
| 2010/0070657 A1* | 3/2010 | Yoshida | G06F 3/1204 | 710/10 |
| 2010/0162226 A1* | 6/2010 | Borissov | G06F 8/67 | 717/173 |
| 2011/0185048 A1* | 7/2011 | Yew | H04M 1/72527 | 709/221 |
| 2011/0205965 A1* | 8/2011 | Sprigg | G06F 9/4411 | 370/328 |
| 2011/0218870 A1* | 9/2011 | Shams | G06Q 20/204 | 705/17 |
| 2011/0303741 A1* | 12/2011 | Bolton | G06Q 10/087 | 235/375 |
| 2012/0066079 A1* | 3/2012 | Falzone | G06Q 20/20 | 705/16 |
| 2012/0096451 A1* | 4/2012 | Tenbarge | G06F 11/1433 | 717/170 |
| 2012/0116906 A1* | 5/2012 | Lundy | G06Q 30/0601 | 705/26.1 |
| 2013/0074061 A1* | 3/2013 | Averbuch | G06F 8/665 | 717/171 |
| 2013/0109316 A1* | 5/2013 | Lee | H04M 1/725 | 455/41.2 |
| 2013/0132167 A1* | 5/2013 | Krug | G07B 15/02 | 705/13 |
| 2013/0201515 A1* | 8/2013 | Daos | H04N 1/00095 | 358/1.14 |
| 2013/0262248 A1* | 10/2013 | Kim | G07G 1/0018 | 705/17 |
| 2013/0290591 A1* | 10/2013 | Schwarzkopf | G06F 1/1632 | 710/303 |
| 2013/0325939 A1* | 12/2013 | Shim | G06Q 50/10 | 709/203 |
| 2014/0096126 A1* | 4/2014 | Gourlay | G05B 15/02 | 717/173 |
| 2015/0006761 A1* | 1/2015 | Miller | G06F 13/122 | 710/3 |
| 2016/0021546 A1* | 1/2016 | Cuervo | H04W 48/18 | 370/254 |
| 2016/0026453 A1* | 1/2016 | Zhang | G06F 8/65 | 717/171 |
| 2016/0094952 A1* | 3/2016 | Mosher | H04W 4/028 | 455/456.1 |
| 2016/0117659 A1* | 4/2016 | Bedier | G06Q 20/204 | 705/16 |
| 2016/0183033 A1* | 6/2016 | Pogorelik | H04W 4/008 | 455/41.1 |
| 2016/0203455 A1* | 7/2016 | Hicks | G07G 1/0081 | 705/75 |
| 2016/0232010 A1* | 8/2016 | Dicks | G06F 8/63 | |
| 2016/0255016 A1* | 9/2016 | Miller | H04L 47/805 | 709/217 |
| 2016/0292660 A1* | 10/2016 | Yu | G07G 1/0009 | |
| 2016/0294967 A1* | 10/2016 | Reveron | H04L 67/327 | |
| 2017/0061405 A1* | 3/2017 | Bryant | G06Q 20/4014 | |
| 2017/0083968 A9* | 3/2017 | Hicks | G06Q 10/087 | |
| 2017/0109532 A1* | 4/2017 | Zarakas | G06F 8/654 | |
| 2017/0140363 A1* | 5/2017 | Hicks | G06Q 20/208 | |
| 2017/0286093 A1* | 10/2017 | Steshenko | G06F 8/71 | |

\* cited by examiner

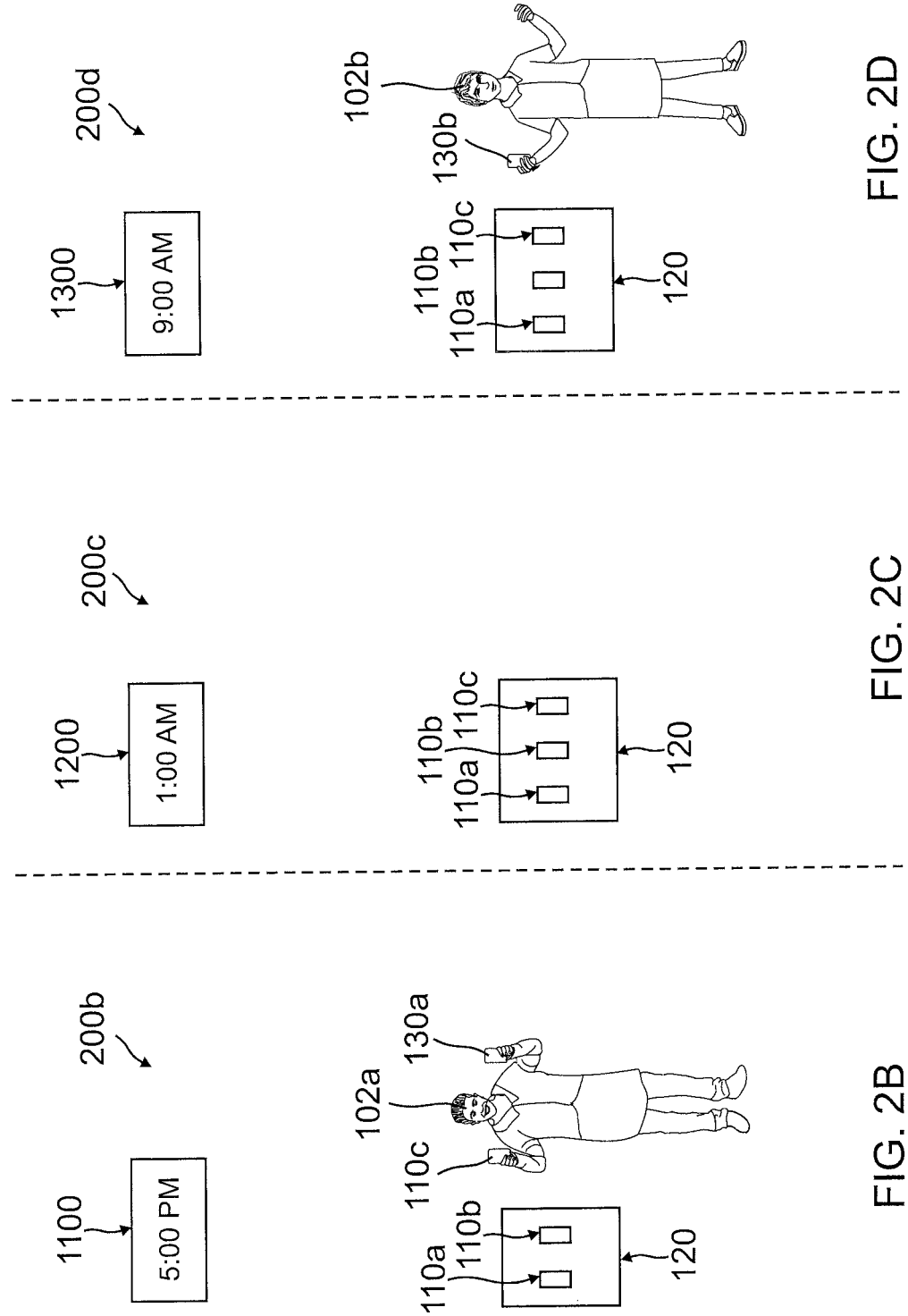

US 10,181,066 B2

SMART HARBOR DEVICE FOR INTELLIGENT UPDATING AND SELECTION FOR USE OF TRANSACTION PROCESSING TERMINAL DEVICES

TECHNICAL FIELD

The present application generally relates to transaction processing terminals, and more specifically to a smart harbor device for intelligent updating and selection for use of transaction processing terminal devices.

BACKGROUND

With the increasing use of payment cards, such as debit and credit cards having a magnetic stripe or embedded chip with stored data, merchants have increased use of mobile payment processing terminals acting as the point-of-sale device. For example, mobile magnetic stripe and/or EMV card readers are capable of providing mobile payment processing at a merchant location or with a mobile merchant through a small device capable of being carried by the merchant or merchant's employees. These payment terminal devices often include a reader type component, as well as necessary hardware that may read payment data encoded on the cards memory (e.g., the magnetic stripe and/or EMV chip), as well as a communication component that may communicate the payment data to a computing device for payment processing. Thus, the payment terminal devices often connect to another computing device, such as mobile communication devices of the merchant or merchant's employees, where the mobile communication devices may have sales and payment processing applications to effectuate a sale and a payment from a customer to the merchant. However, these mobile payment terminal devices may require maintenance, which may interfere with usage of the mobile payment terminal devices, particularly where the merchant or merchant's employee may connect to a device and realize the device requires servicing. Moreover, with the variability in types of mobile communication devices, available hardware, and operating systems, certain mobile payment terminal devices having particular features and/or operability may be better suited for certain mobile communication devices, which may not be immediately apparent to the merchant or merchant's employee.

BRIEF DESCRIPTION OF THE DRAWINGS

FIG. 2B is an exemplary environment displaying use of a transaction processing terminal device synchronized from a smart harbor device, according to an embodiment;

FIG. 2C is an exemplary environment displaying updating of transaction processing terminal devices using a smart harbor device, according to an embodiment;

FIG. 2D is an exemplary environment displaying selection of a transaction processing terminal device for connection to a mobile communication device by a smart harbor device, according to an embodiment;

Figure 1:
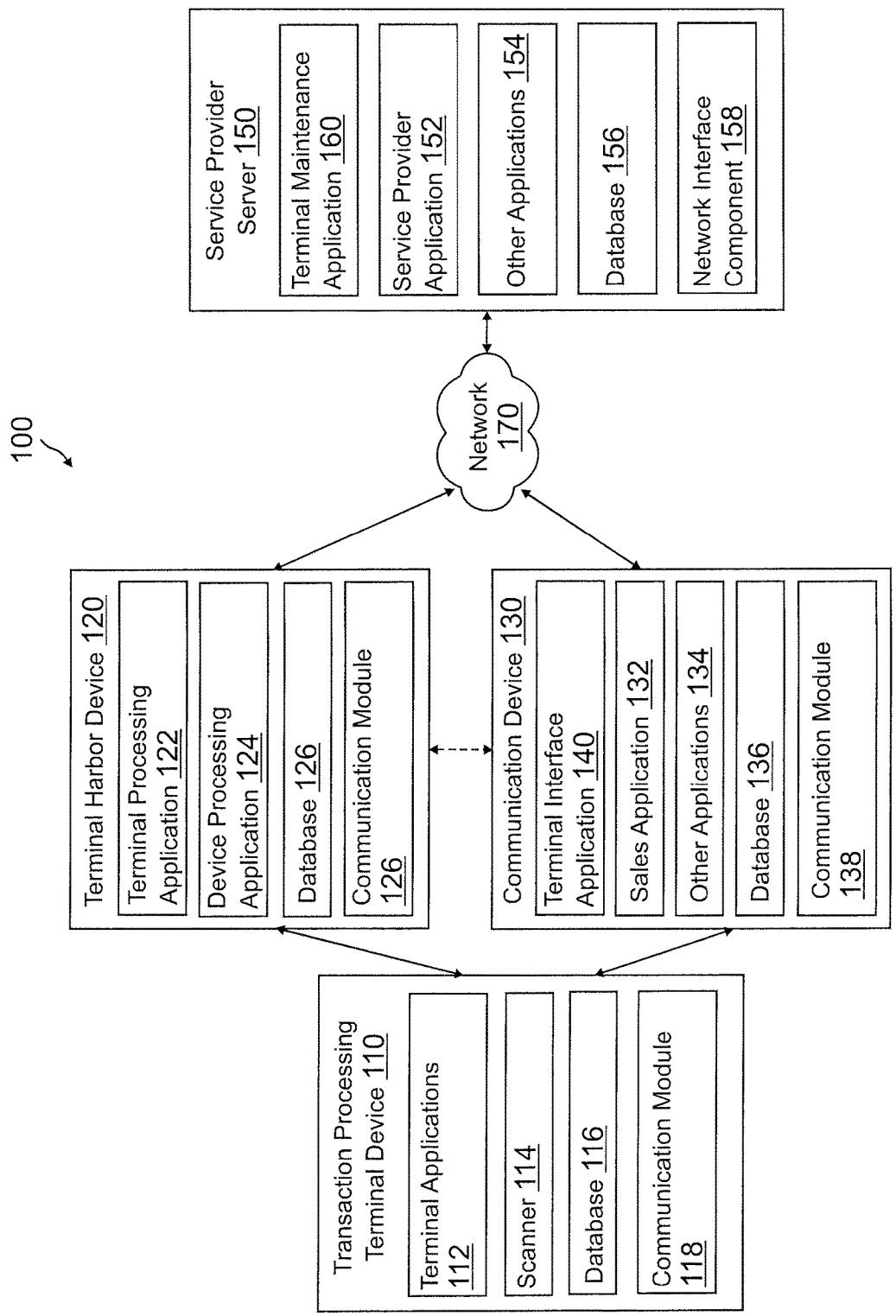
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a smart harbor device for intelligent updating and selection for use of transaction processing terminal devices. Systems suitable for practicing methods of the present disclosure are also provided.

A communication device may be utilized by a user, such as a merchant or merchant employee, to perform various merchant and transaction processes, including sales, checkout, payment processing, and other merchant transactions. In this regard, the communication device, such as a mobile smart phone, tablet computer, wearable computing device, or other type of computing device, may function as a mobile transaction processing device to provide sales to customers and process transactions with the merchant. The communication device may further be utilized to perform other merchant tasks, which may include communicating with customers, accessing and navigating within a merchant website, and/or other services associated with the merchant. The communication device may therefore include one or more software processes to perform the aforementioned actions, which may be included with one or more applications executing on the communication device. For example, the communication device may include a sales application, which may provide sales, checkout, and payment processing services to the user. Such software processes may be utilized through the hardware features of the communication device, such as the hardware processor, device display and other output devices, network access components, input devices, etc. The communication device may therefore include various hardware and software features. Additionally, the communication device may include additional hardware features that allow execution of the processes, such as a power source (e.g., a battery, power cord for an outlet, etc.).

In order to accept input of payment information from a customer, the communication device may interface with a mobile transaction processing terminal device, such as a magnetic stripe and/or EMV card reader. The mobile transaction processing terminal device may include other types of input components, including a scanner for input of bar/QR codes, and interface to provide authentication credentials with a transaction processor, an RFID chip reader, a short range wireless communication component (e.g., through NFC, Bluetooth Low Energy (BLE), LTE Direct, WiFi, or other short range wireless communication protocol), or other type of payment information input device. Thus, the transaction processing terminal device may correspond to a magnetic stripe, EMV chip, or other type of reader, as well as hardware necessary to interface with the reader to determine transaction information from input by the customer, and a communication module or component to connect to the communication device and provide transaction information to the communication device (e.g., through Bluetooth, BLE, WiFi, LTE Direct, NFC, or other short range communication protocol). The transaction processing terminal device may therefore receive input from a customer when the merchant or merchant's employee is performing checkout and transaction processing, such as input for the customer's payment card (e.g., a swipe of a payment card's magnetic stripe, insertion of the payment card's EMV chip, or other input). The transaction processing terminal device may determine the customer and/or payment card's payment information, and may provide the transaction information to the connected communication device for processing (e.g., using a backend payment processor with the communication device).

The merchant may provide a plurality of mobile transaction processing terminal devices at a merchant location. For example, a restaurant or retail location may employ one or more merchant employees to provide sales to customers through the merchant location. In this regard, the mobile transaction processing terminal devices may be made mobile point-of-sale devices instead of fixed point-of-sale devices using the merchant and/or merchant employee's (referred to herein as "merchant" or "merchants") communication device to connect with the transaction processing terminal device and provide transaction processing. However, the transaction processing terminal devices may require maintenance, charging, and/or updates (e.g., software and/or firmware updates). Additionally, the merchant may require assistance in connecting the transaction processing terminal device to the merchant's communication device. For example, the merchant may be required to connect their communication device to the transaction processing terminal device at the beginning of every use, where the transaction processing terminal device was previously disconnected from the communication device at the end of use and/or used by another user prior to use.

In order to provide maintenance and connection assistance for the transaction processing terminal device(s) of the merchant, the merchant may utilize a smart terminal harbor device, which may correspond to a hardware device that provides maintenance and connection services to the transaction processing terminal device(s). The terminal harbor may include a body or port structure where the transaction processing terminal device(s) may be placed, entered, or otherwise connected. Additionally, the terminal harbor may include a power source and at least one power connector used to charge the transaction processing terminal device(s). In order to connect with the transaction processing terminal device(s) and/or one or more communication devices of the merchant, the terminal harbor may further include a communication module or component that may connect to the aforementioned devices. The communication module may utilize wired or wireless connections to the other devices (e.g., the transaction processing terminal device(s) and/or one or more communication devices of the merchant), for example, through USB, microUSB, Lightning®, or other type of wired connection, or through Bluetooth, BLE, LTE Direct, WiFi, or other type of wireless connection.

Additionally, the terminal harbor may include a non-transitory memory, which may store one or more applications executable by the terminal harbor. The applications may include processing applications for the payment terminal device(s) and communication devices. The processing applications may be used to maintain, update, and charge the transaction processing terminal device(s), as well as establish connections between the transaction processing terminal device(s) and one or more communication devices of the merchant. Additionally, the terminal harbor may include one or more hardware processors that execute the processing applications. The terminal harbor may include additional hardware and/or software components. For example, the terminal harbor may include an application usable with a network interface component of the terminal harbor's communication module to connect to a network and communication with one or more devices and/or servers on the network. In this regard, a service provider server available over the network may be used to provide software and/or firmware updates to the terminal harbor, which may be used to install and/or update the software and/or firmware of the terminal harbor and/or the transaction processing terminal device(s).

Thus, the merchant may connect one or more transaction processing terminal devices to the terminal harbor for maintenance, updating, and/or charging. Once connected, a transaction processing terminal device may be scanned through a diagnostic tool of the terminal harbor, such as a tool or process of a terminal processing application. The diagnostic tool may determine one or more conditions or statuses affecting the transaction processing terminal device. For example, the conditions or statuses may be related to the hardware and/or software of the transaction processing terminal device. In this regard, a condition or a status may be software version and/or required software updates, firmware version and/or required firmware updates, damage to software and/or hardware requiring maintenance or resolution, battery charge level, battery conditioning requirements for rechargeable batteries, graphical user interface information (e.g., display output types, effects, and/or capabilities), communication module information (e.g., health, communication protocols, communication signal strength/distance, etc.), or other status or condition affecting the health and/or viability for usage of the transaction processing terminal device. The diagnostic tool may run to determine the condition/status after the transaction processing terminal device is returned to the terminal harbor, for example, after the transaction processing terminal device is used by the merchant during work and/or for transaction processing.

One the status or condition is determined; the terminal harbor may determine one or more processes to resolve the condition(s) of the transaction processing terminal device. For example, the process(es) may correspond to a preventative maintenance of the transaction processing terminal device, a full lifecycle update, battery charging, battery conditioning, a software update, and/or a firmware update. The process(es) may also correspond to an alert to an administrator that may fix or otherwise assist in remedying the condition(s). Additionally, other processes may also resolve the condition(s). The terminal harbor may then execute the processes with the transaction processing terminal device. While executing the process(es) with the transaction processing terminal device, the terminal harbor may include one or more output devices, which may alert other users (e.g., the merchant) that the transaction processing terminal device is currently undergoing maintenance. For example, the output device may include one or more lights or a small output display, where the output may alert a user that the transaction processing terminal device associated with the display (e.g., next to, under, or connected to) is not for use (e.g., a red light, a "Do not use" sign, etc.).

Once the process(es) is/are completed, the output device may signal that the transaction processing terminal device is now good or viable for use. For example, a light may turn to green, or the output display may show "Ready for use." In other embodiments, the notification may be sent to a device or server, such as the merchant's communication device and/or the service provider server. In various embodiments, prior to readying the transaction processing terminal device for use, the terminal harbor may further run the diagnostic tool to determine whether any conditions or statuses still remain on the transaction processing terminal device. If so, the terminal harbor may repeat the process prior to resolving all conditions affecting the transaction processing terminal device. Additionally, the terminal harbor device may also run a troubleshooting or trial run tool, process, or application, which may be used to determine whether the transaction processing terminal device will perform adequately under performance conditions (e.g., transaction processing). Thus, the terminal harbor may wait to provide a "ready for use" status for the harbor device to finish maintenance and test running the transaction processing terminal device.

The terminal harbor may repeat the above process for additional transaction processing terminal devices connected to the harbor device. Such maintenance may be performed on connection of each of the transaction processing terminal devices to the terminal harbor, or may be staggered so that one or more payment terminal devices are always available for use. Additionally, as each transaction processing terminal device is connected to the terminal harbor and maintenance is performed, the terminal harbor may establish and update a database of transaction processing terminal devices, where the database may include information on which transaction processing terminal devices are available for use, which require maintenance or are receiving maintenance, and which transaction processing terminal devices are unavailable (e.g., broken or require physical maintenance). Additionally, the database may include information on time of use of each of the transaction processing terminal devices, type of use, communication devices using each of the payment terminal devices, and/or capabilities of the communication devices and/or transaction processing terminal devices. The transaction processing terminal devices may be connected to the terminal harbor through a wired or wireless connection, and may be detected and/or connected for maintenance through connecting to the terminal harbor, placing in an area of the terminal harbor, and/or "tapping" or performing an action with the terminal harbor.

The database information on the device usage and/or available devices may be used to determine when to service and/or perform maintenance on each of the transaction processing terminal devices. For example, one or more of the transaction processing terminal devices may be serviced when the transaction processing terminal device(s) has a "downtime" or is not in use. In one example, such downtime may occur during night or when the merchant is closed, where the merchant is not performing business and not using the transaction processing terminal device(s) for transaction processing. However, other intelligent decision-making of service time may also be utilized. In this regard, certain transaction processing terminal devices may be utilized for certain communication devices of the merchant, where those certain communication devices are used at certain times (e.g., where an iPhone for a merchant is always used between 10 AM-6 PM Monday-Friday). Thus, the terminal harbor may maintain that specific transaction processing terminal device during the downtime, and make sure that the transaction processing terminal device is usable between the specific times required.

At other times a schedule, such as a shift schedule, may be used to determine how many and which transaction processing terminal devices are required at certain times, and when other transaction processing terminal device may be serviced. At other times, the processes required to perform maintenance on the transaction processing terminal device may affect when the transaction processing terminal device is serviced. For example, battery conditioning of a rechargeable battery may take considerably longer than a small patch to software of the transaction processing terminal device. Thus, such processes may be performed during closed hours or where the transaction processing terminal device is not needed. Other information may also affect when to service one or more of the transaction processing terminal devices, for example, current sales volume and/or detected customers, merchant device health, health and status of transaction processing terminal devices currently in use, or other factors.

The terminal harbor may also be used for intelligent selection for use of a transaction processing terminal device with a requesting communication device. For example, a communication device may request use of a transaction processing terminal device. In this regard, the communication device may connect with the terminal harbor. The connection may occur through a wired or wireless connection. In various embodiments, the request may be generated by the user of the communication device (e.g., the merchant), for example, through an application executing on the communication device. However, in other embodiments, the request may be automatically generated when the communication device connects to the terminal harbor. In various embodiments, such connection may occur automatically when the user walks within range of the terminal harbor with the communication device. The request may be processed by the terminal harbor using the information of available and unavailable transaction processing terminal devices. Thus, the terminal harbor may determine an available payment terminal device, and may connect the selected transaction processing terminal device to the communication device. For example, where the transaction processing terminal device uses a Bluetooth connection to connect with a device for transaction processing, the terminal harbor may configure the Bluetooth connectivity settings of the communication device and/or transaction processing terminal device to connect through Bluetooth (e.g., by activating the Bluetooth connection module of both devices, causing the communication device to search for a signal having an identifier from the transaction processing terminal device, and connecting to the transaction processing terminal device through such a signal). In other embodiments, other connections may be established between the communication device and the selected/available transaction processing terminal device, including wired or wireless connections. In further embodiments, instructions may be output to the merchant on the communication device to establish the connection. Additionally, the terminal harbor device may cause an alert on an output device of the terminal harbor device that is associated with the selected transaction processing terminal device that notifies the user to take and use that transaction processing terminal device. Such notification may also or instead be displayed on the communication device.

Once connected, the merchant may use the transaction processing terminal device to perform transaction processing through the communication device. For example, the transaction processing terminal device may receive transaction information input from a customer and provide the information to the communication device. The communication device may then perform transaction processing through a backend payment processor, such as the service provider. In various embodiments, the transaction processing terminal may further provide offline transaction processing, for example, offline EMV transaction processing. In this regard, the transaction processing terminal may lose connectivity to a backend transaction processing entity (e.g., network, cloud, merchant device, etc.). In such embodiments, the transaction processing terminal may locally verify the cryptogram and/or PIN provided to the transaction processing terminal by a user and/or input by a merchant during transaction processing (e.g., through payment instrument entry). The transaction processing terminal may provide approval and may store the transactions to a cache. The cache may have a fixed size and availability to store transactions (e.g., 200 transactions). The stored transactions may be uploaded and processed on connection of the transaction processing terminal to a network/cloud or the terminal harbor device.

During use, the transaction processing terminal device may further monitor the transaction processing terminal devices, for example, through the communication device and/or wireless communications with the transaction processing terminal devices. If one transaction processing terminal device begins failing, requires an update, or otherwise should be discontinued from use, the terminal harbor may notify the user through the transaction processing terminal device and/or the communication device. The terminal harbor may further select another transaction processing terminal device, and may notify the user of the new transaction processing terminal device. Additionally, the terminal harbor may assist in connecting the new transaction processing terminal device to the communication device. Once the previous transaction processing terminal device is reconnected to the terminal harbor, the terminal harbor may service the transaction processing terminal device as previously discussed.

The terminal harbor may further provide intelligent selection of a transaction processing terminal device to pair to a communication device through additional information. For example, information on a maintenance schedule of the transaction processing terminal devices may be used to select a best transaction processing terminal device to pair with the communication device (e.g., one that currently does not require maintenance or where other devices currently require maintenance). Thus, the current health, maintenance schedule, and/or statistics of the transaction processing terminal devices may be used to select one or more of the transaction processing terminal devices. Additionally, selection of the transaction processing terminal device may depend on cached transactions and cache size of the transaction processing terminal device. Thus, one of the parameters used to select a transaction processing terminal may be the cache size and space availability, as well as required transactions for uploading and processing stored to a transaction processing terminal (e.g., favoring devices with more cache availability and/or servicing transaction processing terminals having stored transactions). In other embodiments, the terminal harbor may select a transaction processing terminal device based on the compatibility of the transaction processing terminal device with the communication device. For example, the specification of the communication device may be retrieved (e.g., from the communication device and/or the database based on previously stored information), where the specifications may correspond to the device type (e.g., smart phone, tablet, etc.), hardware capabilities, software capabilities, installed software, available hardware devices, operating system, or other specification. Additionally, the specifications and/or capabilities of the transaction processing terminal may be determined. Such information may be used to determine which devices are most compatible. For example, an Android® type device may function better with a transaction processing terminal device specific to Android specifications.

In other embodiments, the selection may be made based on the features of the communication device. For example, certain transaction processing terminal devices may function better with a tablet or with a mobile smart phone. In such embodiments, the presentation on the output display of the communication device may affect the selection of the transaction processing terminal device. Other types of communication devices may also be used, as well as auxiliary devices of the transaction processing terminal device. For example, a transaction processing terminal device with an associated headset may be selected for certain communication devices. Moreover, the role of the merchant employee and/or the merchant employees work information may be used to select a transaction processing terminal device. In this regard, the aforementioned transaction processing terminal device with a headset may be reserved for drive-through merchants, whereas a transaction processing terminal device without a headset may be selected for a merchant assisting dine-in customers. Similarly, a transaction processing terminal device with a full charge may be reserved for a merchant having a long shift, whereas a half charged payment terminal device may be provided to a merchant with a short shift. Similarly, the amount of use and/or transaction processing by the merchant in the past may affect selection of a transaction processing terminal device.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a transaction processing terminal device 110, a terminal harbor device 120, a communication device 130, and a service provider server 150 in communication over a network 170. A user, such as a merchant (not shown), may utilize transaction processing terminal device 110 to perform transaction processing with communication device 130, which may utilize service provider server 150 in various embodiments to process transactions with the merchant. Transaction processing terminal device 110 may interface with terminal harbor device 120 for maintenance of transaction processing terminal device 110, for example, updates, charging, and other types of device maintenance. In various embodiments, service provider server 150 may provide the updates for transaction processing terminal device 110. Once serviced, terminal harbor device 120 may make transaction processing terminal device 110 available for use. Thus, later when communication device 130 requires further use of transaction processing terminal device 110, terminal harbor device 120 may select transaction processing terminal device 110 based on the maintenance performed on transaction processing terminal device 110, as well as the capabilities and/or specifications of communication device 130.

Transaction processing terminal device 110, terminal harbor device 120, communication device 130, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Transaction processing terminal device 110 may be implemented as a terminal for receiving input of transaction (e.g., payment) information that may utilize appropriate hardware and software configured for wired and/or wireless communication with terminal harbor device 120 and communication device 130. For example, in one embodiment, transaction processing terminal device 110 may be implemented as a magnetic stripe reader, EMV chip reader, or other types of computing devices capable of transmitting and/or receiving data, including payment information. Transaction processing terminal device 110 may correspond be utilized by a user, such as a merchant or employee of the merchant, during processing for a transaction. In this regard, transaction processing terminal device 110 may correspond to an input device that receives input correspond to transaction information, such as a swipe of a magnetic stripe, input of an EMV chip, or other type of input. Although only one terminal device is shown, a plurality of terminal devices may function similarly.

Transaction processing terminal device 110 of FIG. 1 contains terminal applications 112, a scanner 114, a database 116, and a communication module 118. Terminal applications 112 may correspond to executable processes, procedures, and/or applications with associated hardware. In other embodiments, payment terminal device 110 may include additional or different modules having specialized hardware and/or software as required.

Terminal applications 112 may correspond to one or more processes to execute modules and associated devices of payment terminal device 110 to connect to terminal harbor device 120 and/or communication device 130, as well as receive transaction information from a customer and provide the transaction information to communication device 130 for payment processing. In this regard, terminal applications 112 may correspond to specialized hardware and/or software utilized by transaction processing terminal device 110 to connect and/or disconnect from terminal harbor device 120 and/or communication device 130. In this regard, terminal applications 112 may include a communication application that may utilize communication module 118 of transaction processing terminal device 110 to send and receive data signals. Terminal applications 112 may establish a connection with communication device 130 using the data signals. For example, terminal applications 112 may broadcast an identifier, such as a universally unique identifier (UUID), which may be receivable by terminal harbor device 120 and/or communication device 130. In other embodiments, terminal applications 112 may instead receive an identifier from terminal harbor device 120 and/or communication device 130. Using the identifier(s), terminal applications 112 may communicate with terminal harbor device 120 and/or communication device 130. However, in other embodiments, a wired connection may be utilized, where terminal applications 112 may be utilized to interface with terminal harbor device 120 and/or communication device 130. Terminal applications 112 may connect to terminal harbor device 120 for purposes of maintenance and servicing. Thus, terminal harbor device 120 may update and/or troubleshoot terminal applications 112 when transaction processing terminal device 110 is connected to terminal harbor device 120, as discussed herein. Terminal applications 112 may provide information on the health, statuses, and conditions for transaction processing terminal device 110 to terminal harbor device 120 while connected to terminal harbor device 120 for maintenance.

Terminal applications 112 may further include input applications and associated processes to receive input, such as transaction information from a customer. Thus, terminal applications 112 may connect with communication device 130 for the purposes of transaction processing. In various embodiments, terminal harbor device 120 may generate the connection between transaction processing terminal device 110 and communication device 130. Once connected with communication device 130, payment terminal device may be used for transaction processing. For example, the merchant associated with communication device 130 may provide sales, checkout, and transaction processing services to customers through transaction processing terminal device 110 and communication device 130. In this regard, a customer in a transaction with the merchant may provide input to transaction processing terminal device 110, where the input may correspond to transaction information. For example, the input may correspond to a payment card (e.g., magnetic stripe, EMV chip, etc.), or may be other types of input, including authentication information for a payment account, or other type of input. Terminal applications 112 may receive the input through an input mechanism of transaction processing terminal device 110 (e.g., scanner 114). In various embodiments, terminal applications 112 may determine the transaction information from the input. Terminal applications 112 may provide the transaction information to communication device 130 for transaction processing. Thus, terminal applications 112 may interface with one or more applications of communication device 130 to provide the transaction information. Once completed with the transaction, terminal applications 112 may provide further transaction processing, for example, through additional input for further transactions. Additionally, terminal applications 112 may be used to provide health, statuses, and conditions of transaction processing terminal device 110 to terminal harbor device 120 during use of transaction processing terminal device 110. Additionally, terminal applications 112 may be further provide processes to disconnect from communication device 130 after usage of transaction processing terminal device 110.

In various embodiments, terminal applications 112 include other additional applications as may be desired in particular embodiments to provide features to transaction processing terminal device 110. For example, terminal applications 112 may include security applications for implementing client-side security features, programmatic client applications for interfacing with appropriate application programming interfaces (APIs) over network 170, or other types of applications. Terminal applications 112 may also include additional communication applications that allow a user to send and receive payment information and other data between devices. Other applications 114 may include device interface applications that may receive input and/or output information. For example, other applications 114 may contain software programs, executable by a processor, including a graphical user interface (GUI) configured to provide an interface to the user.

Transaction processing terminal device 110 further includes a scanner 114, which may correspond to an input device or mechanism of payment terminal device 110. In this regard, scanner 114 may correspond to a magnetic stripe reader, an EMV chip reader, an RFID scanner, a short range communication module, or other type of input device that may read data from a physical object provided to the merchant by a customer for processing a transaction between the merchant and the customer. In other embodiments, scanner 114 may instead or further correspond to other types of input devices, including a keypad, keyboard, touch screen interface, or other input device capable of receiving payment information (e.g., a username, password, PIN or other authentication mechanism). Scanner 114 may be used by terminal applications 112 to receive data corresponding to the transaction information.

Transaction processing terminal device 110 may further include database 116 stored to a transitory and/or non-transitory memory of transaction processing terminal device 110, which may store various applications and data and be utilized during execution of various modules of transaction processing terminal device 110. Thus, database 116 may include, for example, identifiers (IDs) such as IDs associated with hardware of transaction processing terminal device 110 or other appropriate IDs. Database 116 may include data for payment information, as well as information on conditions and/or statuses of transaction processing terminal device 110. In various embodiments, the transaction information and information on the conditions and/or statues of transaction processing terminal device 110 may be provided to one or more of terminal harbor device 120 and/or communication device 130.

Transaction processing terminal device 110 includes at least one communication module 118 adapted to communicate with terminal harbor device 120 and/or communication device 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Terminal harbor device 120 may be implemented as a docking, port, or harbor device that may utilize appropriate hardware and software configured for wired and/or wireless communication with transaction processing terminal device 110, communication device 130, and/or service provider server 150. For example, in one embodiment, communication device 130 may be implemented as a personal computer (PC), docking device, and/or other types of computing devices capable of transmitting and/or receiving data. Terminal harbor device 120 may be utilized by a merchant to intelligently service transaction processing terminal devices, such as transaction processing terminal device 110, as well as provide intelligent selection of one of the transaction processing terminal devices for pairing with communication device 130. Although only one terminal harbor device is shown, a plurality of terminal harbor devices may function similarly.

Communication device 130 of FIG. 1 contains a terminal processing application 122, a device processing application 124, a database 126, and a communication module 128. Terminal processing application 122 and device processing application 124 may correspond to executable processes, procedures, and/or applications with associated hardware. In other embodiments, terminal harbor device 120 may include additional or different modules having specialized hardware and/or software as required.

Terminal processing application 122 may correspond to one or more processes to execute modules and associated devices of terminal harbor device 120 to connect to one or more transaction processing terminal devices, such as transaction processing terminal device 110, perform maintenance and servicing of the transaction processing terminal device (s), and connect transaction processing terminal device 110 to communication device 130 based on the health of transaction processing terminal device 110 and the specifications of communication device 130. In this regard, terminal processing application 122 may correspond to specialized hardware and/or software utilized by terminal harbor device 120 to first connect to transaction processing terminal device 110. Terminal processing application 122 may connect to transaction processing terminal device 110 through a wired or wireless connection. For example, terminal harbor device 120 may connect with transaction processing terminal device 110 through a USB, microUSB, Lightning®, or other wired connection, where terminal processing application 122 may interface with one or more APIs executing on transaction processing terminal devices 110 in order to perform the aforementioned features. However, in other embodiments, terminal harbor device 120 may connect with transaction processing terminal device 110 through a wireless connection, such as Bluetooth, BLE, NFC, LTE Direct, WiFi, or other short range communication protocol. In order to connect over a wireless connection, terminal processing application 122 may broadcast an identifier receivable by payment terminal device 110 over a short range proximity to terminal harbor device, such as a signal strength for short range wireless communications. Transaction processing terminal device 110 may receive the identifier, and use the identifier to establish a communication channel and/or exchange data. In other embodiments, transaction processing terminal device 110 may broadcast the identifier, where terminal processing application 122 may similarly receive the identifier and use the identifier to open and establish a communication channel with transaction processing terminal device 110 and/or exchange data. Thus, payment terminal device 110 may connect with terminal harbor device 120 when in proximity to terminal harbor device 120, for example, when transaction processing terminal device 110 is place on, nearby, or in terminal harbor device 120.

Once connected, terminal processing application 122 may determine one or more conditions or statuses affecting transaction processing terminal device 110. For example, terminal processing application 122 may execute a diagnostic tool or process which scans transaction processing terminal device 110 to determine at least one condition (e.g., the health of the software and/or hardware, versions of the software and/or hardware requiring update, require maintenance and/or conditioning, etc.) for transaction processing terminal device 110. The condition(s) may affect the operability of transaction processing terminal device 110, or may be required for further use of transaction processing terminal device 110. For example, the condition(s) may correspond to a power level or battery condition, out of date software/ firmware, damage to software and/or hardware, and/or new software for use with transaction processing terminal device 110. Additional conditions may also affect the health and/or operability of transaction processing terminal device 110.

Once the condition(s) of transaction processing terminal device 110 are determined, terminal processing application 122 may determine at least one process to execute with transaction processing terminal device 110 to remedy or resolve the condition(s) so that the condition(s) no longer affect transaction processing terminal device 110. Terminal processing application 122 may determine the process(es) based on the condition as one or more instructions to resolve the condition(s) stored to database 126 and/or available with service provider server 150. For example, the process(es) may correspond to a charging instruction, battery conditioning, preventive maintenance, update process for software and/or firmware, and/or other processes for fixing, servicing, updating, and/or charging transaction processing terminal device 110. Once the process(es) is/are determined, terminal processing application 122 may execute the process(es) with transaction processing terminal device 110. Additionally, terminal processing application 122 may further execute the diagnostic tool to determine if further conditions require resolution, and/or may execute a troubleshooting/test run process or application to determine whether transaction processing terminal device 110 is ready for use.

Terminal processing application 122 may include processes to update output displays and/or database 126 with information of available transaction processing terminal devices. For example, terminal processing application 122 may change output displays, such as LEDs or other signal lights, which may indicate whether payment terminal device 110 is available for use. For example, where transaction processing terminal device 110 is unavailable (e.g., when maintenance processes, such as the diagnostic tool and/or processes determined to resolve conditions, are executing), an output display may show a red light or display "Unavailable" or "Do not use." However, where transaction processing terminal device 110 is available, the output display may show a green light or display "Available" or "Ready for use." Additionally, database 126 may include data entries (e.g., table entries in a database table for available and unavailable transaction processing terminal devices) that indicate which transaction processing terminal devices are available and unavailable, which may further include identifiers receivable by one or more other devices indicating the availability of the transaction processing terminal devices.

Additionally, terminal processing application 122 may determine when to perform the processes with transaction processing terminal device 110 and/or other transaction processing terminal devices. For example, terminal processing application 122 may determine and/or receive data on usage of transaction processing terminal devices, including transaction processing terminal device 110. The usage may correspond to times of usage, types of usage, schedules for usage, or other information on the required availability of the transaction processing terminal devices. In this regard, usage information for transaction processing terminal device 110 may be determined by monitoring the usage of transaction processing terminal device 110 and/or receiving input about the usage of transaction processing terminal device 110 from the merchant and/or and administrator of terminal harbor device 120. Using the usage information, terminal processing application 122 may determine when to perform the process(es) to resolve the issues of transaction processing terminal device 110. For example, a time to perform the processes and/or update transaction processing terminal device 110 may correspond to downtime in usage of transaction processing terminal device 110 and/or other transaction processing terminal devices. Thus, the time may be selected to insure that transaction processing terminal device 110 is available when required.

Terminal processing application 122 may also receive a request to connect to a transaction processing terminal device. The request may be originated by communication device 130, for example, on connection of communication device 130 to terminal harbor device 120. Communication device 130 may connect to terminal harbor device 120 using a wired or wireless connection. For example, communication device 130 may connect to terminal harbor device 120 through a USB, microUSB, Lightning®, or other communication port. Once connected terminal processing application 122 may interface with communication device 130, where a request to connect transaction processing terminal device 110 to communication device 130 for payment processing may be generated. The request may be generated by communication device 130, for example, on connection to terminal harbor device 120 or based on input by the merchant to communication device 130. In other embodiments, on detection of communication device 130 connecting to terminal harbor device 120, terminal processing application 122 may generate the request. In other embodiments, terminal harbor device 120 and communication device 130 may connect through a wireless connection, such as Bluetooth, BLE, NFC, LTE Direct, WiFi, or other short range communication protocol. In order to connect over a wireless connection, terminal processing application 122 may broadcast an identifier receivable by communication device 130 over a short range proximity to terminal harbor device, such as a signal strength for short range wireless communications. Communication device 130 may receive the identifier, and use the identifier to establish a communication channel and/or exchange data. In other embodiments, communication device 130 may broadcast the identifier, where terminal processing application 122 may similarly receive the identifier and use the identifier to open and establish a communication channel with communication device 130 and/or exchange data. Thus, communication device 130 may connect with terminal harbor device 120 when in proximity to terminal harbor device 120, for example, when communication device 130 is place on, nearby, or in terminal harbor device 120.

Once the request is generated, terminal harbor device 120 may select a transaction processing terminal device of the one or more transaction processing terminal devices available to terminal harbor device 120, such as transaction processing terminal device 110. For example, terminal harbor device 120 may select transaction processing terminal device 110 after servicing transaction processing terminal device 110 and when transaction processing terminal device 110 is available for use as indicated in database 126. Thus, terminal processing application 122 may select a transaction processing terminal device based on its availability and after performing maintenance/servicing on the transaction processing terminal device. Moreover, terminal processing application 122 may select payment terminal device 110 over another available payment terminal device, for example, where the other transaction processing terminal device may require further maintenance (e.g., additional charging, updating of software/firmware, etc.). Thus, terminal processing application 122 may intelligently select a transaction processing terminal device to pair to communication device 130 on request based on the maintenance and availability of each of the transaction processing terminal devices available to terminal harbor device 120.

In further embodiments, terminal harbor device 120 may also or instead select transaction processing terminal device 110 based on device capabilities and specifications of communication device 130. The capabilities and/or specifications may correspond to a device type, brand, available hardware, available software, and/or other processes or features of communication device 130. Additionally, the capabilities and/or specifications of transaction processing terminal device 110 may further be used to select transaction processing terminal device 110. Transaction processing terminal device 110 may be selected for an ease of use with communication device 130, an ease or feasibility of connection between transaction processing terminal device 110 and communication device 130, and/or a compatibility of transaction processing terminal device 110 with communication device 130. The compatibility may be determined based on the features and/or processes of transaction processing terminal device 110 and communication device 130. In various embodiments, transaction processing terminal device 110 may further be selected based on the merchant associated with communication device 130 and/or the usage of communication device 130 for transaction processing. For example, based on the merchant's role and/or schedule, transaction processing terminal device 110 may be selected as a "best fit" or most preferable. Such selection may further depend on the condition and/or capabilities of transaction processing terminal device 110, include auxiliary devices of transaction processing terminal device 110 (e.g., a headset with earphones and a microphone, a specific input/display device, etc.). Transaction processing terminal device 110 may be selected based on the amount of time or the specific times that the merchant requires transaction processing terminal device 110. Transaction processing terminal device 110 may also be selected based on the time and length of usage with communication device 110. Such information may be determined based on past usage, or may be input by the merchant. The merchant may the use transaction processing terminal device 110 for transaction processing with communication device 130, as discussed herein. Once the merchant associated with communication device 130 is completed with using transaction processing terminal device 110, transaction processing terminal device 110 may be returned to terminal harbor device 120. For example, the merchant may connect transaction processing terminal device 110 back to terminal harbor device 120. Once connected, terminal processing application 122 may perform maintenance and servicing, as discussed above.

Device processing application 124 may correspond to one or more processes to execute modules and associated devices of terminal harbor device 120 to determine device capabilities and/or usage of communication device 130, and provide the information to terminal processing application 122. In this regard, device leasing application 132 may correspond to specialized hardware and/or software utilized by terminal processing application 122 to retrieve and/or determine device and usage information for communication device 130. In various embodiments, device processing application 124 may determine the device capabilities and specifications from scanning communication device 130 and/or retrieving data from a server, such as a look-up of device data for communication device 130. In other embodiments, such data may be stored to database 126 for one or more communication devices, which may be retrievable by device processing application 124. The information may be determined using an identifier for communication device 130 and/or the hardware/software of communication device 130, or other data identifying the features and/or process of communication device 130. Additionally, device processing application 124 may further determine usage requirements or other information for communication device 130 related to payment processing. For example, the usage requirements may correspond to required usage of communication device 130 with payment terminal device 110. Thus, the usage requirements may include information about sales, checkout, and transaction processing by the merchant associated with communication device 130. Such information may be determined based on past usage of communication device 130 with payment terminal device 110, or may be received from input by the merchant or an administrator of terminal harbor device 120.

Terminal harbor device 120 may further include database 126 stored to a transitory and/or non-transitory memory of terminal harbor device 120, which may store various applications and data and be utilized during execution of various modules of communication device 130. Thus, database 126 may include, for example, identifiers (IDs) such as operating system registry entries, cookies associated with device processing application 124 and/or other applications 134, IDs associated with hardware of terminal harbor device 120, or other appropriate IDs, such as IDs of transaction processing terminal device 110 and/or communication device 130. Database 126 may include conditions and/or statuses of one or more transaction processing terminal devices, such as transaction processing terminal device 110, as well as processes for resolution of conditions and/or statuses. Additionally, database 126 may further include maintenance information such as a database of available and/or unavailable transaction processing terminal devices. Additionally, information used for selection of transaction processing terminal device 110 to pair with communication device 130 may be stored to database 126, such as required usage information of transaction processing terminal device 110 by communication device 130.

Terminal harbor device 120 includes at least one communication module 128 adapted to communicate with transaction processing terminal device 110, communication device 130, and/or service provider server 150. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Communication device 130 may be implemented as a communication device that may utilize appropriate hardware and software configured for wired and/or wireless communication with transaction processing terminal device 110, terminal harbor device 120, and/or service provider server 150. For example, in one embodiment, communication device 130 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Communication device 130 may correspond to and be utilized by a merchant for transaction processing based on received transaction data from transaction processing terminal device 110. Although only one communication device is shown, a plurality of communication devices may function similarly.

Communication device 130 of FIG. 1 contains a terminal interface application 140, a sales application 132, other applications 134, a database 136, and a communication module 138. Terminal interface application 140, sales application 132, and other applications 134 may correspond to executable processes, procedures, and/or applications with associated hardware. In other embodiments, communication device 130 may include additional or different modules having specialized hardware and/or software as required.

Terminal interface application 140 may correspond to one or more processes to execute modules and associated devices of communication device 130 to interface with transaction processing terminal device 110 to receive transaction information, for example, by connecting with transaction processing terminal device 110. In this regard, device leasing application 132 may correspond to specialized hardware and/or software utilized by communication device 130 to establish a connection with transaction processing terminal device 110. The connection may correspond to a wired connection, where data is exchanged through a physical connection, such as a USB, microUSB, Lightning®, or other connection. Thus, terminal interface application 140 may interface with one or more applications of transaction processing terminal device 110 through one or more APIs. In other embodiments, terminal interface application 140 may connect with payment terminal device 110 through a wireless connection, such as Bluetooth, BLE, NFC, LTE Direct, WiFi, or other short range wireless communication protocol. In such embodiments, terminal interface application 140 may broadcast an identifier receivable by transaction processing terminal device 110 or may be receive an identifier for payment terminal device 110, where the identifier may be used to establish a connection between transaction processing terminal device 110 and communication device 130 and/or exchange data. In various embodiments, terminal interface application 140 may similarly connect with terminal harbor device 120 request use of transaction processing terminal device 110, as well as establish a connection with transaction processing terminal device 110. Additionally, after connecting with transaction processing terminal device 110, terminal interface application 140 may receive data from transaction processing terminal device 110, such as transaction information (e.g., payment card information, such as a credit/debit card number and backend processing gateway, as well as authentication information, such as a username, password, or PIN). Terminal interface application 140 may provide the transaction information to sales application 132 for processing.

Sales application 132 may correspond to one or more processes to execute modules and associated specialized hardware of communication device 130 that provide sales, checkout, and payment processes for a transaction to purchase one or more items for sale from the merchant corresponding to communication device 130. In this regard, sales application 132 may correspond to specialized hardware and/or software of communication device 130 to provide a convenient interface to permit a merchant to enter, view, and/or edit items and/or services for purchase by user 102. For example, sales application 132 may be implemented as an application having a user interface enabling the merchant to enter item information and request payment for a transaction on checkout/payment of one or more items/services. In certain embodiments, sales application 132 may correspond more generally to a web browser configured to view information available over the Internet or access a website corresponding to the merchant and/or payment provider server 140. Thus, sales application 132 may provide item sales through an online marketplace using the website of the merchant. Thus, a merchant using transaction processing terminal device 110 with communication device 130 may process a transaction using sales application 132.

Once a payment amount is determined for a transaction for items to be purchased by a customer, the merchant may request payment from the customer, for example, through transaction information input to transaction processing terminal device 110. The provided transaction information may be communicated to communication device 130 with the transaction and transaction information for approval by transaction processing terminal device 110. A service provider server, such as service provider server 150, may process the transaction with the provided transaction information and determine whether to approve or decline the transaction using a payment instrument for the payment process used with the acceptance mechanism. Sales application 132 may then receive the results of the transaction processing, and complete the transaction with the customer, for example, by providing the customer the items for the transaction or declining the transaction where the customer is not authenticated or the transaction is not authorized (e.g., insufficient funds). As discussed herein, transaction processing terminal device 110 may be used to initiate and process the transaction.

Communication device 130 includes other applications 134 as may be desired in particular embodiments to provide features to communication device 130. For example, other applications 134 may include security applications for implementing client-side security features, programmatic client applications for interfacing with appropriate application programming interfaces (APIs) over network 170, or other types of applications. Other applications 134 may also include email, texting, voice and IM applications that allow a user to send and receive emails, calls, texts, and other notifications through network 170. In various embodiments, other applications 134 may include financial applications, such as banking, online payments, money transfer, or other applications associated with communication device 130. Other applications 134 may contain software programs, executable by a processor, including a graphical user interface (GUI) configured to provide an interface to the user.

Communication device 130 may further include database 136 which may include, for example, identifiers such as operating system registry entries, cookies associated with sales application 132 and/or other applications 134, identifiers associated with hardware of communication device 130, or other appropriate identifiers, such as identifiers used for payment/user/device authentication or identification. Identifiers in database 136 may be used by a payment/credit provider to associate communication device 130 with a particular account maintained by the payment/credit provider. Database 136 may further include payment information, transaction information, and/or results.

Communication device 130 includes at least one communication module 138 adapted to communicate with transaction processing terminal device 110, terminal harbor device 130, and/or service provider server 150. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 150 may be maintained, for example, by an online service provider, which may maintenance services for transaction processing terminal devices, as well as transaction processing with a merchant. In this regard, service provider server 150 includes one or more processing applications which may be configured to interact with transaction processing terminal device 110, terminal harbor device 120, communication device 130, and/or another device/server to facilitate leasing of devices. In one example, service provider server 150 may be provided by PAYPAL®, Inc. of San Jose, Calif., USA. However, in other embodiments, service provider server 150 may be maintained by or include a financial service provider, social networking service, email or messaging service, media sharing service, and/or other service provider, which may provide device leasing services, for example, for the use of an application and/or account.

Service provider server 150 of FIG. 1 includes a terminal maintenance application 160, a service provider application 152, other applications 154, a database 156, and a network interface component 158. Terminal maintenance application 160, service provider application 152, and other applications 154 may correspond to executable processes, procedures, and/or applications with associated hardware. In other embodiments, service provider server 150 may include additional or different modules having specialized hardware and/or software as required.

Terminal maintenance application 160 may correspond to one or more processes to execute modules and associated specialized hardware of service provider server 150 to provide maintenance processes and data for use in servicing transaction processing terminal device 110 by terminal harbor device 120. In this regard, terminal maintenance application 160 may correspond to specialized hardware and/or software to receive a request for process(es) and/or data to service transaction processing terminal device 110 from terminal harbor device 120. For example, terminal harbor device 120 may request information on how to service and/or maintain transaction processing terminal device 110 based on detected conditions and/or statuses of payment terminal device 110 by terminal harbor device 120. The information may correspond to one or more processes to resolve the detected conditions and/or statuses. In other embodiments, terminal harbor device 120 may request updates, patches, or other software/firmware that may be used with a process to service transaction processing terminal device 110. Terminal maintenance application 160 may provide the information to terminal harbor device 120 over network 170. Additionally, terminal maintenance application 160 may be used to update terminal harbor device 120 with new processes to resolve conditions or statuses of transaction processing terminal devices, such as software, firmware, or other data used in servicing transaction processing terminal devices.

Service provider application 152 may correspond to one or more processes to execute modules and associated specialized hardware of service provider server 150 to provide services to a merchant, such as receiving and/or transmitting information for establishing an account or utilizing another service of service provider server 150. In this regard, service provider application 152 may correspond to specialized hardware and/or software to establish an account, for example, a payment account, which may be utilized to send and receive payments and monetary transfers and engage in other financial transactions. A user, such as a merchant, associated with communication device 130 may establish an account with service provider application 152 by providing personal and/or financial information to service provider server 150 and selecting an account login, password, and other authentication information. The account may be accessed and/or used through a browser application and/or dedicated payment application executed by payment terminal device 110. In order to authenticate an identity of the merchant and/or for use of the account, service provider application 152 may authenticate the merchant for use of the account and/or identity. Once authenticated, service provider application 152 may be utilized to use various services provided by service provider server 150, such as payment services or other available service. Service provider application 152 may then process payments to the merchant through received payment information in a transaction from communication device 130. Payments may be provided using the payment information to the payment account for the merchant.

In various embodiments, service provider server 150 includes other applications 154 as may be desired in particular embodiments to provide features to service provider server 150. For example, other applications 154 may include security applications for implementing server-side security features, programmatic client applications for interfacing with appropriate application programming interfaces (APIs) over network 170, or other types of applications. Other applications 154 may contain software programs, executable by a processor, including a graphical user interface (GUI), configured to provide an interface to the user when accessing payment provider server 134. In various embodiments where not provided by service provider application 152, other applications 154 may include connection and/or communication applications.

Additionally, service provider server 150 includes database 156. Accounts in database 156 may include entity information, such as name, address, birthdate, payment/funding information, additional user financial information, and/or other desired user data. The entity may link to their respective accounts through an account, user, merchant, and/or device ID, as well as a generated token, which may be provided to communication device 130 for use. Thus, when an ID is transmitted to service provider server 150, e.g., from transaction processing terminal device 110, an account belonging to the entity may be found. Additional data used in servicing transaction processing terminal device 110 and other terminals, such as processes and associated data, may be stored to database 156.

In various embodiments, service provider server 150 includes at least one network interface component 158 adapted to communicate with transaction processing terminal device 110, terminal harbor device 120, and/or communication device 130 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
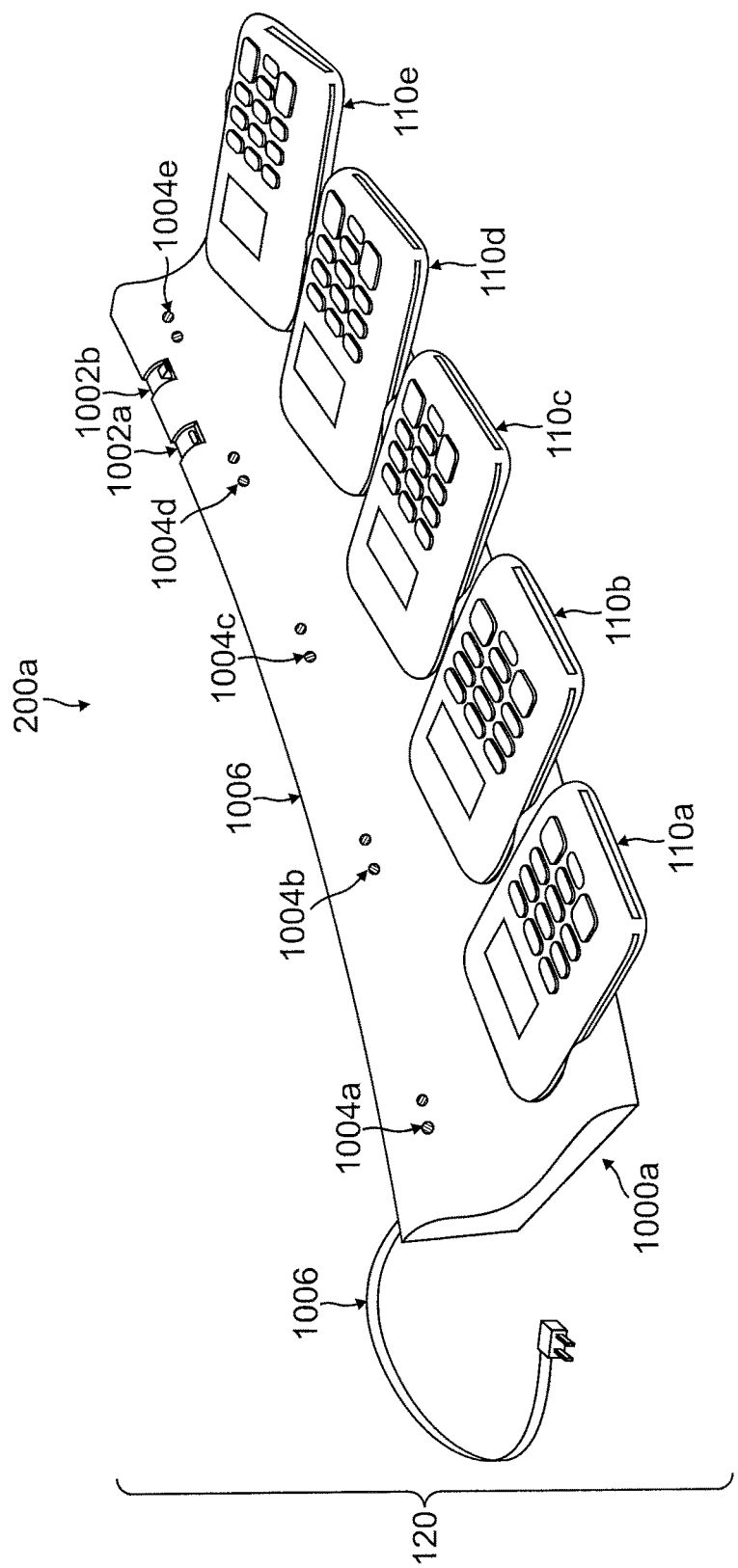
FIG. 2A is an exemplary smart harbor device for intelligent updating and selection for use of transaction processing terminal devices, according to an embodiment.

FIG. 2A is an exemplary smart harbor device for intelligent updating and selection for use of transaction processing terminal devices, according to an embodiment. Environment 200*a* of FIG. 2A includes terminal harbor device 120, for example, an exemplary embodiment of terminal harbor device 120 discussed in reference to environment 100 of FIG. 1.

An exemplary structure of terminal harbor device 120 is shown in environment 200*a* of FIG. 2A. In other embodiments, different structures, body shapes, and/or ports may be used for terminal harbor device 120. Terminal harbor device 120 is shown with a body or port structure 1000, which includes a docking port 1000*a*. Docking port 1000*a* may be configured to accept one or more transaction processing terminal devices, such as one or more of transaction processing terminal devices 110*a-e*. In this regard, docking port 1000*a* may be configured as a shelf, port, or other structure with transaction processing terminal devices 110*a-e* may be placed, inserted, connected to or otherwise associated with terminal harbor device 120. Once placed on docking port 1000*a*, terminal harbor device 120 may connect with transaction processing terminal devices 110*a-e* in order to provide maintenance and servicing of payment terminal devices 110*a-e*, including charging, repairing, updating, or otherwise resolving issues, conditions, and/or statuses of transaction processing terminal devices 110*a-e*.

In this regard, terminal harbor device 120 includes a power supply 1006, where power may be provided to hardware of terminal harbor device 120, which may be used during the execution of software and associated processes of terminal harbor device 120. Power supply 1006 may also provide necessary power to charge transaction processing terminal devices 110*a-e*. For example, docking port 1000*a* may include one or more charging mechanism for transaction processing terminal devices 110*a-e*. The charging mechanism may correspond to wired charging through a wired connection, such as a USB, microUSB, Lightning®, or other connection. In other embodiments, the charging mechanism may be wireless, such as wireless inductive charging using an inductive coil in docking port 1000*a*. In other embodiments, where transaction processing terminal devices 110*a-e* include removable batteries, docking port 1000*a* may include a removable battery charger through a wired connection or wireless charging (e.g., inductive charging).

Terminal harbor device 120 further includes one or more connection ports or interfaces, which may be utilized as a communication module to interface with one or more communication devices of a merchant or merchants. For example, terminal harbor device 120 includes a wired connection port 1002*b* which may be used to connect through a wired connection with a communication device of a merchant. Additionally, terminal harbor device 120 includes a wireless interface 1002*a*, which may generate wireless connections with one or more communication devices. Using a connection with a communication device, terminal harbor device 120 may select one of transaction processing terminal devices 110*a-e* for use with the communication device based on the availability of transaction processing terminal devices 110*a-e* and the capabilities of the communication device.

Additionally, terminal harbor device 120 includes one or more notification lights, which may notify users (e.g., merchants) of the availability of transaction processing terminal devices 110*a-e* and/or which transaction processing terminal device of transaction processing terminal devices 110*a-e* has been connected to the users' communication devices. For example, lights 1004*a-e* are shown with two exemplary display lights. Lights 1004*a-e* may change color in response to the availability of transaction processing terminal devices 110*a-e*, for example, which have been serviced and/or charged, and which require further servicing, charging, or other maintenance. Additionally, as a merchant connects a communication device to terminal harbor device 120, one of lights 1004*a-e* associated with the selected transaction processing terminal device from transaction processing terminal devices 110*a-e* may light up in response to the selection to alert the merchant which of transaction processing terminal devices 110*a-e* to remove and utilize.

FIG. 2B is an exemplary environment displaying use of a transaction processing terminal device synchronized from a smart harbor device, according to an embodiment. Environment 200*b* of FIG. 2B includes terminal harbor device 120, for example, an exemplary embodiment of terminal harbor device 120 discussed in reference to environment 100 of FIG. 1. Environment 200*b* further includes transaction processing terminal devices 110*a-b* not in use and a payment terminal device 110*c* in use, all corresponding generally to transaction processing terminal device 110 discussed in reference to environment 100 of FIG. 1. Additionally, environment 200*b* includes a communication device 130*a* corresponding generally to communication device 130 discussed in reference to environment 100 of FIG. 1.

In environment 200*b*, a merchant 102*a* is utilizing communication device 130*a* to perform transaction processing using transaction processing terminal 110*c* as an input device to receive payment information from a customer during transaction processing with the customer. In this regard, terminal harbor device 120 may be utilized to select transaction processing terminal device 110*c* and pair transaction processing terminal device 110*c* to communication device 130*a*. For example, payment terminal device 110*c* may be selected as transaction processing terminal devices 110*a-b* are being serviced by terminal harbor device 120, and thus still connected to terminal harbor device 120. In this regard, as transaction processing terminal devices 110*a-v* may be required by other merchants, transaction processing terminal devices 110*a-b* may only be receiving charging maintenance or other minor maintenance, and may still be available for use. Additionally, transaction processing terminal device 110*c* may also or instead be selected based on the compatibility of transaction processing terminal device 110*c* with communication device 130*a*. Such selection may occur at the start of merchant 102*a*'s shift, for example, at 5:00 PM shown in time 1100. Thus, when merchant 102*a* finishes their shift and returns transaction processing terminal device 110*c* to terminal harbor device 120, for example, at 1:00 AM shown in time 1200 of FIG. 2C, transaction processing terminal device 110*c* may be serviced along with transaction processing terminal devices 110*a-b*.

FIG. 2C is an exemplary environment displaying updating of payment transaction processing devices using a smart harbor device, according to an embodiment. Environment 200*c* of FIG. 2C includes terminal harbor device 120, for example, an exemplary embodiment of terminal harbor device 120 discussed in reference to environment 100 of FIG. 1. Environment 200*c* further includes transaction processing terminal devices 110*a-c* not in use, all corresponding generally to transaction processing terminal device 110 discussed in reference to environment 100 of FIG. 1.

In environment 200*c*, all of transaction processing terminal devices 110*a-c* have been returned to terminal harbor device 120. At time 1200, 1:00 AM, the merchant location corresponding to environment 200*c* may be closed, and none of transaction processing terminal devices 110*a-c* may be required for use. In this regard, terminal harbor device 120 may execute lengthy maintenance procedures on transaction processing terminal devices 110a-c that would normally make transaction processing terminal devices 110a-c unavailable for an extended period of time. For example, software updates and/or patches may be installed, firmware may be updated, battery conditioning may occur on rechargeable batteries, or other process necessary to remedy or resolve any condition or status affecting transaction processing terminal devices 110a-c may be performed. Thus, at 9:00 AM shown in time 1300 of FIG. 2D, transaction processing terminal devices 110a-c may be ready for use and fully serviced.

FIG. 2D is an exemplary environment displaying selection of a transaction processing terminal device for connection to a mobile communication device by a smart harbor device, according to an embodiment. Environment 200d of FIG. 2D includes terminal harbor device 120, for example, an exemplary embodiment of terminal harbor device 120 discussed in reference to environment 100 of FIG. 1. Environment 200d further includes transaction processing terminal devices 110a-c not in use, all corresponding generally to transaction processing terminal device 110 discussed in reference to environment 100 of FIG. 1. Additionally, environment 200d includes a communication device 130b corresponding generally to communication device 130 discussed in reference to environment 100 of FIG. 1.

In environment 200d, a second merchant, a merchant 102b, begins their shift and requires use of one of transaction processing terminal devices 110a-c for use with communication device 130b during payment processing for a transaction (e.g., to enter payment information from a customer). Thus, merchant 102b may connect communication device 130b to terminal harbor device 120 through a wired and/or wireless connection, and may request use of one of transaction processing terminal devices 110a-c. Once connected, terminal harbor device 120 may select one of transaction processing terminal devices 110a-c based on the maintenance history, status, and/or availability of transaction processing terminal devices 110a-c, as well as the compatibility of payment terminal devices 110a-c with communication device 130b (e.g., based on the capabilities and/or specifications of transaction processing terminal devices 110a-c and communication device 130b).

Figure 3:
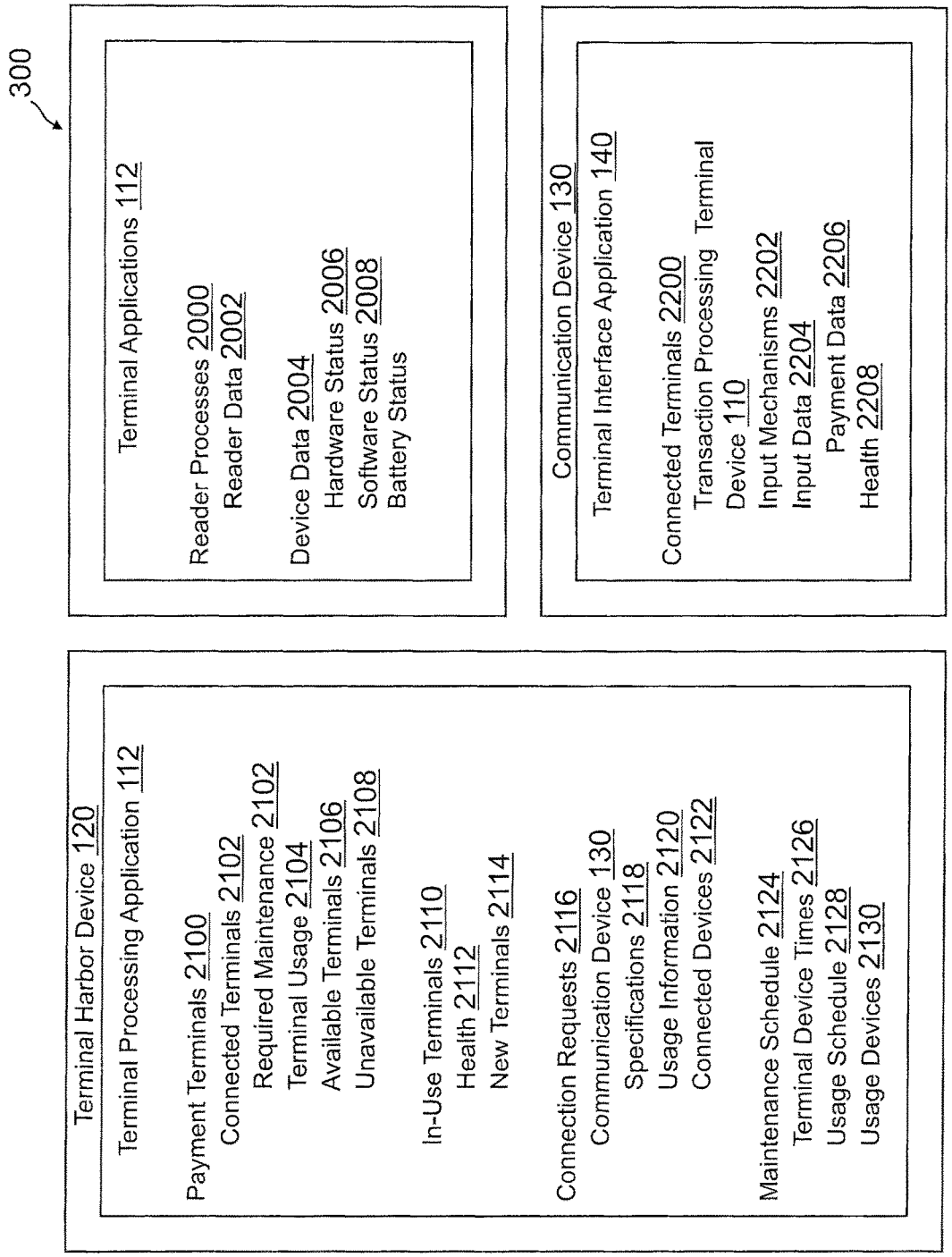
FIG. 3 is an exemplary system environment having interacting devices for use of a smart harbor device for intelligent updating and selection for use of transaction processing terminal devices, according to an embodiment.

FIG. 3 is an exemplary system environment having interacting devices for use of a smart harbor device for intelligent updating and selection for use of transaction processing terminal devices, according to an embodiment. Environment 300 of FIG. 3 includes a transaction processing terminal device 110, a terminal harbor device 120, and a communication device 130 corresponding generally to the described devices and associated features found in system 100 of FIG. 1.

Transaction processing terminal device 110 executes terminal applications 112 corresponding generally to the specialized hardware and/or software modules and processes described in reference to FIG. 1. In this regard, terminal applications 112 including information for conditions, health, and/or statuses of transaction processing terminal device 110, as well as software processes used in transaction processing, and connected devices to send transaction information during processing. Thus, terminal applications 112 include at least reader processes 2000 used to read payment data from a payment instrument, such as a debit or credit card having a magnetic stripe and/or EMV chip. Thus, reader processes 2000 may include reader data, such as the payment data read from the payment instrument. Additionally, terminal applications 112 may further include device data 2004 on the conditions, health, and/or statuses of transaction processing terminal device 110. For example, device data 2004 may include hardware status 2006, software statues 2008, and/or battery status 2010. Additional information may also be associated with device data 2004 in further embodiments.

Terminal harbor device 120 executes terminal processing application 122 corresponding generally to the specialized hardware and/or software modules and processes described in reference to FIG. 1. In this regard, terminal processing application 122 may be used to service one or more transaction processing terminal devices, including transaction processing terminal device 110, and connect transaction processing terminal device to communication device 130 on request by communication device 130. Thus, terminal processing application 122 includes information for transaction processing terminals 2100 connected to terminal harbor device 120, such as connected terminals 2102. For connected terminals 2102, terminal processing application 122 may further determine required maintenance, for example, using device data 2004 of transaction processing terminal device 110. Connected terminal 2102 may also include information for terminal usage 2104, available terminals 2106 for use by a merchant, and/or unavailable terminals 2108 requiring maintenance by terminal harbor device 120. Transaction processing terminals 2100 may further include information for in-use terminals 2110, such as health 2112 for in-use terminals 2110, and new terminals 2114 that may be utilized to replace failing terminals determined from health 2112.

Terminal processing application 122 may further receive connection requests 2116, such as a request from communication device 130. Communication device 130's request may be associated with specifications 2118 for communication device 130, as well as usage information of communication device 130 with previous transaction processing terminal devices. Based on the aforementioned information a connected device 2122 may be determined and connected to communication device 130. Connected device 2122 may be selected based on specifications 2118 and/or usage information, and may also be selected based on maintenance schedule 2124. For example, maintenance schedule 2124 may be determined when to service connected terminals 2102 as established in terminal device times 2126. Terminal device times 2126 for connected terminals 2102 may be determined using a usage schedule 2128 and usages devices 2130, such as devices requesting connection to connected terminals 2102.

Communication device 130 executes a terminal interface application 140 corresponding generally to the specialized hardware and/or software modules and processes described in reference to FIG. 1. In this regard, terminal interface application 140 may be used to connect with transaction processing terminal device 110 and interface with transaction processing terminal device 110 to receive transaction information from transaction processing terminal device 110. For example, terminal interface application 140 includes information for connected terminals 2200, such as transaction processing terminal device 110. Additionally, transaction processing terminal device 110 may be associated with input mechanisms 2202, such as a scanner, card reader, keypad, or other input device. Using input mechanisms 2202, terminal interface application 140 may receive input data 2204, such as payment data 2206. Additionally, terminal interface application 140 may monitor a health 2208 of transaction processing terminal device 110, which may be reported to terminal harbor device 120, for example, if transaction processing terminal device 110 is in danger of failing.

Figure 4:
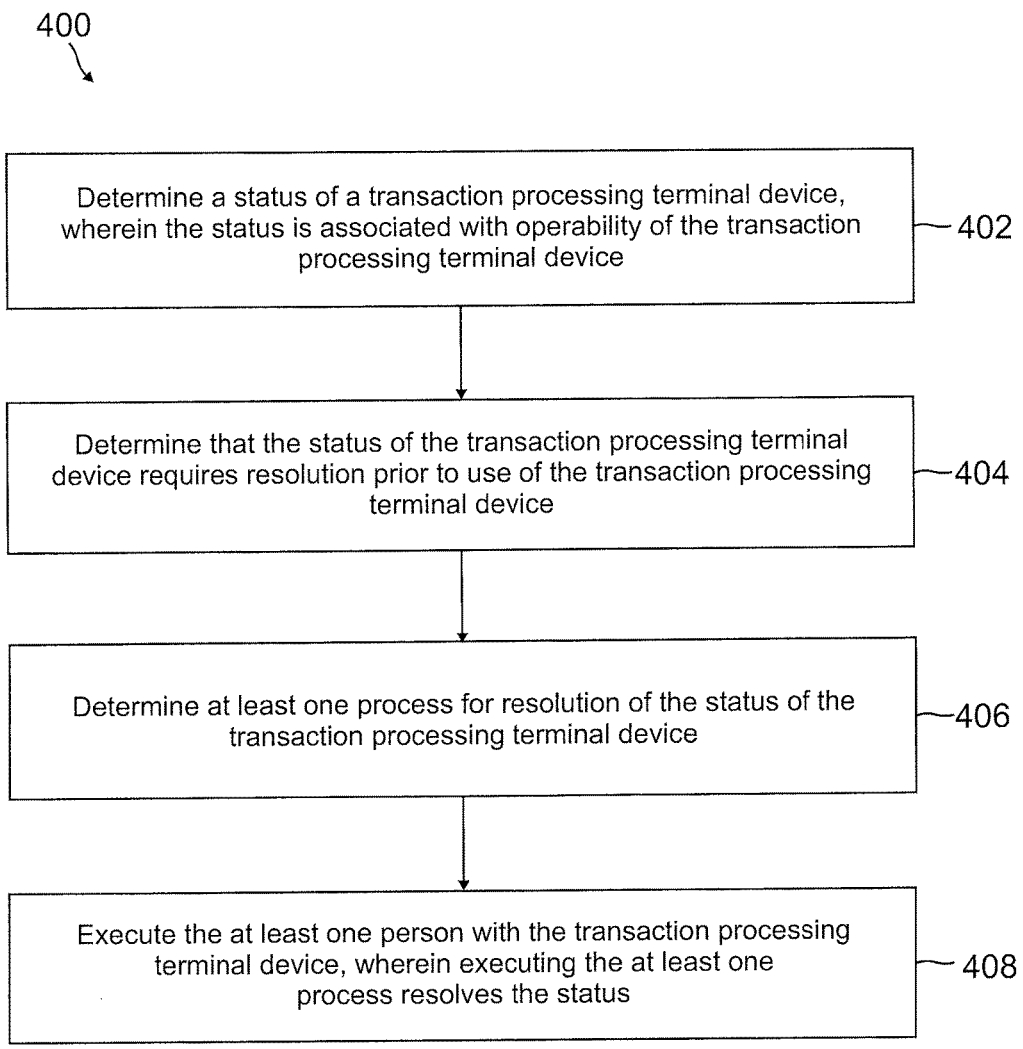
FIG. 4 is an exemplary process flowchart for use of a smart harbor device for intelligent updating and selection for use of transaction processing terminal devices, according to an embodiment.

FIG. 4 is an exemplary process flowchart for use of a smart harbor device for intelligent updating and selection for use of transaction processing terminal devices, according to an embodiment. Note that one or more steps, processes, and methods described herein may be omitted, performed in a different sequence, or combined as desired or appropriate.

At step 402, a status of the transaction processing terminal device is determined, wherein the status is associated with operability of the transaction processing terminal device. The status may be determined by a terminal harbor device or system. In this regard, the terminal harbor may comprise a port structure configured to accept at least one transaction processing terminal device for management of resources of the at least one transaction processing terminal device, a power source, at least one power connector configured to provide power to charge the at least one transaction processing terminal device, a communication component configured to connect to a plurality of devices, wherein the plurality of devices comprise the at least one transaction processing terminal device and at least one communication device of a user, a non-transitory memory storing a terminal processing application, and one or more hardware processors configured to execute the terminal processing application. The status may be determined when the transaction processing terminal device is connected to a terminal harbor device or system.

At step 404, it is determined that the status of the transaction processing terminal device requires resolution prior to use of the transaction processing terminal device. The status may comprises one of a power level of the transaction processing terminal device, required software updates for the transaction processing terminal device, required firmware updates for the transaction processing terminal device, and battery maintenance for the transaction processing terminal device.

At least one process for resolution of the status of the transaction processing terminal device is determined, at step 406. The at least one process may comprise at least one of a preventative maintenance of the at least one transaction processing terminal device, a full lifecycle update of the at least one transaction processing terminal device, battery charging for the at least one transaction processing terminal device, battery conditioning for the at least one transaction processing terminal device, a software update of the at least one transaction processing terminal device, and a firmware update of the at least one transaction processing terminal device.

At step 408, the at least one process is executed with the transaction processing terminal device, wherein executing the at least one process resolves the status. Additionally, it may be determined when to execute the at least one process with the transaction processing terminal device based on use of the transaction processing terminal device and the at least one process may be executed with the transaction processing terminal device during a downtime in use of the transaction processing terminal device. In further embodiments, it may be determined when at least one other transaction processing terminal device is available, wherein the executing the at least one process with the transaction processing terminal device during the downtime in use of the transaction processing terminal device is further when the at least one other transaction processing terminal device is available.

In various embodiments, is may be determined that the transaction processing terminal device is ready for use based on the executing the at least one process with the transaction processing terminal device. Additionally, a troubleshooting process with the transaction processing terminal device may be executed, wherein the determining that the transaction processing terminal device is ready for use after the update utilizes the troubleshooting process. The information that the transaction processing terminal device is ready for use may be stored and later used. For example, a request to connect to one of a plurality of transaction processing terminal devices may be received from a communication device of a user. Thus, the transaction processing terminal device may be selected based on the information that the transaction processing terminal device is ready for use, and the transaction processing terminal device may be connected to the communication device based on the information.

In various embodiments, capability information for the communication device may be determined, wherein the connecting the transaction processing terminal device to the communication device further uses the capability information. For example, the capability information comprises at least one of software capabilities of the communication device, hardware capabilities of the communication device, a type of the communication device, a brand of the communication device, input components of the communication device, output components of the communication device, an operating system of the communication device, graphical user interfaces of the communication device, and communication module components of the communication device.

In further embodiments, wherein selecting the transaction processing terminal device to pair with the communication device further comprises determining that at least one transaction processing terminal device of the plurality of payment transaction processing devices is not compatible with the communication device, or may comprise determining that the transaction processing terminal device is compatible with the communication device. Additionally, the information for the transaction processing terminal device may be stored with terminal information for the plurality of transaction processing terminal devices, wherein the terminal information comprises identifiers for each of the plurality of transaction processing terminal devices that establish whether each of the plurality of transaction processing terminal devices are ready for use. Thus, the information may include available and unavailable transaction processing terminal devices. Thus, where a second transaction processing terminal device was not ready for use but was serviced and now is ready for use, a new identifier for the second payment terminal device may be generated, wherein the new identifier establishes that the second transaction processing terminal device is ready for use.

Figure 5:
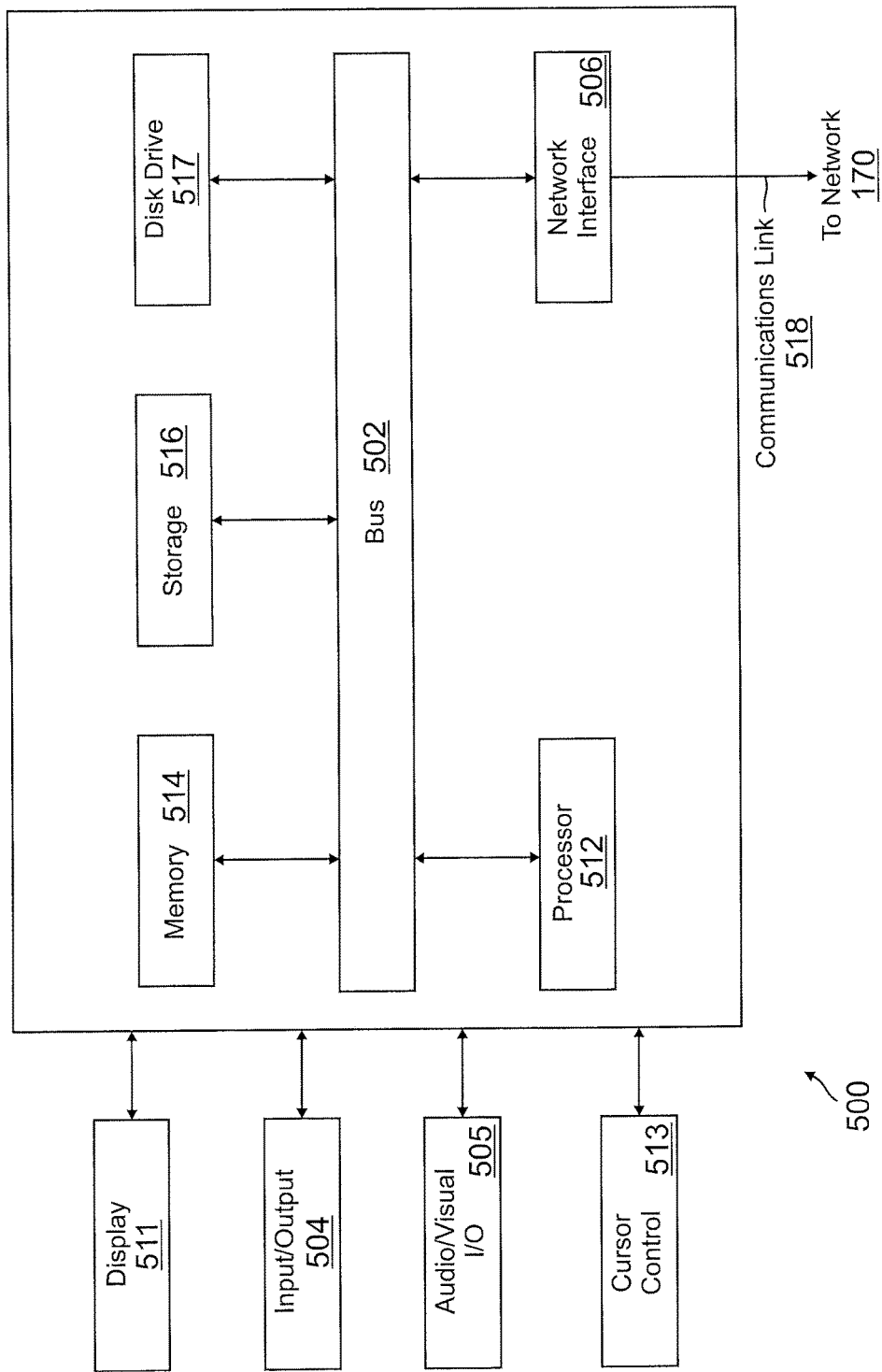
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/ output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A terminal harbor device comprising:
   a port structure configured to accept a transaction processing terminal device for management of resources of the transaction processing terminal device;
   a power source;
   at least one power connector configured to provide power to charge the transaction processing terminal device;
   a communication component configured to connect to a plurality of devices, wherein the plurality of devices comprise the transaction processing terminal device and a communication device of a user;
   a non-transitory memory storing instructions; and
   one or more hardware processors coupled to the non-transitory memory and configured to read instructions from the non-transitory memory to cause the terminal harbor device to perform operations comprising:
      receiving device data for the transaction processing terminal device from the communication component, wherein the communication component connects to the transaction processing terminal device when the transaction processing terminal device is docked in the port structure;
      determining a condition of the transaction processing terminal device;
      determining that the condition requires resolution prior to use of the transaction processing terminal device;
      determining a one process for the resolution of the condition;
      executing the process with the transaction processing terminal device;
      updating a status of the transaction processing terminal device to a ready to use mode;
      in response to the updating, detecting the communication device within a pairing range of the terminal harbor device;

determining a transaction processing cache size available to the transaction processing terminal device for electronic transaction processing with the communication device;
selecting the transaction processing terminal device based on the status and the transaction processing cache size.

2. The terminal harbor device of claim 1, wherein the operations further comprise:
determining capabilities of the communication device; and
automatically pairing the communication device with the transaction processing terminal device,
wherein the selecting the transaction processing terminal device is further based on the capabilities.

3. The terminal harbor device of claim 1, wherein the process comprises one of a preventative maintenance of the transaction processing terminal device, a full lifecycle update of the transaction processing terminal device, battery charging for the transaction processing terminal device, battery conditioning for the transaction processing terminal device, a software update of the transaction processing terminal device, or a firmware update of the transaction processing terminal device.

4. The terminal harbor device of claim 3, wherein the transaction processing terminal device comprises one of a plurality of transaction processing terminal devices, and wherein the executing the process with the transaction processing terminal device comprises:
determining a time for updating or maintenance of each of the plurality of transaction processing terminal devices based on usage information for the plurality of transaction processing terminal devices, wherein the time comprises a downtime in use of the each of the plurality of transaction processing terminal devices; and
performing updates on the each of the plurality of transaction processing terminal devices based on the time for the updating or the maintenance of the each of the plurality of transaction processing terminal devices.

5. The terminal harbor device of claim 4, wherein the communication component connects to the transaction processing terminal device through wireless communications.

6. A terminal harbor system comprising:
a non-transitory memory; and
one or more hardware processors coupled to the non-transitory memory and configured to read instructions from the non-transitory memory to cause the terminal harbor system to perform operations comprising:
connecting, by the terminal harbor system, to a first transaction processing terminal device;
determining a first status of the first transaction processing terminal device, wherein the first status is associated with non-operability of the first transaction processing terminal device;
determining that the first status requires resolution prior to use of the first transaction processing terminal device;
determining a first process for resolution of the first status; and
executing the first process with the first transaction processing terminal device, wherein executing the first process resolves the first status;
updating the first status to a second status comprising a ready to use mode;
in response to the updating, detecting a communication device within a pairing range of the terminal harbor system using first short range wireless communications with the communication device, wherein the communication device uses a wireless communication protocol available to the first transaction processing terminal device for the first short range wireless communications with the terminal harbor system;
determining a transaction processing cache size available to the first transaction processing terminal device for electronic transaction processing with the communication device;
selecting the first transaction processing terminal device based on the second status and the transaction processing cache size.

7. The terminal harbor system of claim 6, wherein the operations further comprise:
storing the second status that the first transaction processing terminal device is in the ready for use mode on the first transaction processing terminal device.

8. The terminal harbor system of claim 6, wherein, prior to detecting the communication device, the operations further comprise:
receiving a request to connect to one of a plurality of transaction processing terminal devices from the communication device, wherein the plurality of transaction processing terminal devices comprise the first transaction processing terminal device.

9. The terminal harbor system of claim 7, wherein the second status comprises an identifier that establishes whether the first transaction processing terminal device is in the ready for use mode.

10. The terminal harbor system of claim 9, wherein the operations further comprise:
determining a third status of a second transaction processing terminal device, wherein the second status is associated with non-operability of the second transaction processing terminal device;
determining that the third status requires resolution prior to use of the second transaction processing terminal device;
determining a one second process for resolution of the third status;
executing the second process with the second transaction processing terminal device, wherein executing the second process resolves the third status;
determining that the second transaction processing terminal device is in the ready for use mode; and
establishing a fourth status of the second transaction processing terminal device, wherein the fourth status comprises a new identifier establishing that the second transaction processing terminal device is in the ready for use mode.

11. The terminal harbor system of claim 6, wherein the operations further comprise:
determining capability information for the communication device,
wherein selecting the first transaction processing terminal device for the communication device further uses the capability information.

12. The terminal harbor system of claim 11, wherein the capability information comprises at least one of software capabilities of the communication device, hardware capabilities of the communication device, a type of the communication device, a brand of the communication device, input components of the communication device, output components of the communication device, an operating system of the communication device, graphical user interfaces of the communication device, or communication module components of the communication device.

13. The terminal harbor system of claim 11, wherein the selecting the first transaction processing terminal device further comprises determining that a second transaction processing terminal device is not compatible with the communication device using the capability information.

14. The terminal harbor system of claim 6, wherein the first status comprises one of a power level of the first transaction processing terminal device, software updates for the first transaction processing terminal device, firmware updates for the first transaction processing terminal device, or battery maintenance for the first transaction processing terminal device.

15. The terminal harbor system of claim 6, wherein the executing the first process with the first transaction processing terminal device comprises:
    determining when to execute the first process with the first transaction processing terminal device based on use of the first transaction processing terminal device; and
    executing the first process with the first transaction processing terminal device during a downtime in use of the first transaction processing terminal device.

16. The terminal harbor system of claim 15, wherein the executing the first process with the first transaction processing terminal device further comprises:
    determining when at least one other transaction processing terminal device is available,
    wherein the executing the first process with the first transaction processing terminal device during the downtime in use of the first transaction processing terminal device further occurs when the at least one other transaction processing terminal device is available.

17. A method comprising:
    connecting, by a terminal harbor system, to a transaction processing terminal device;
    detecting that the transaction processing terminal device has a software update available for use with the transaction processing terminal device;
    retrieving the software update from a service provider associated with the transaction processing terminal device;
    updating the transaction processing terminal device with the software update;
    determining that the transaction processing terminal device is ready for use after the software update;
    in response to the determining, detecting a communication device within a pairing range of the terminal harbor system using first short range wireless communications with the communication device, wherein the communication device uses a wireless communication protocol available to the transaction processing terminal device for the first short range wireless communications with the terminal harbor system;
    determining a transaction processing cache size available to the transaction processing terminal device for electronic transaction processing with the communication device;
    selecting the transaction processing terminal device based on the determining that the transaction processing terminal device is ready for use and the transaction processing cache size; and
    automatically pairing the communication device to the transaction processing terminal device through second short range wireless communications.

18. The method of claim 17, further comprising:
    executing a troubleshooting process with the transaction processing terminal device, wherein the troubleshooting process determines whether the transaction processing terminal device is ready for use after the software update; and
    storing information that the transaction processing terminal device is ready for use after the software update.

19. The method of claim 18, further comprising:
    receiving a request to use the transaction processing terminal device from a communication device; and
    determining that the transaction processing terminal device is available for use using the information,
    wherein the selecting the transaction processing terminal device further uses the information.

20. The method of claim 18, wherein the information further comprises available and unavailable transaction processing terminal devices for use by a user with the communication device.

* * * * *

UNITED STATES PATENT AND TRADEMARK OFFICE
CERTIFICATE OF CORRECTION

PATENT NO. : 10,181,066 B2
APPLICATION NO. : 15/174679
DATED : January 15, 2019
INVENTOR(S) : Satish Govindarajan et al.

Page 1 of 1

It is certified that error appears in the above-identified patent and that said Letters Patent is hereby corrected as shown below:

In the Claims

In Column 28, Line 59, change "determining a one process" to --determining a process--.

In Column 30, Line 41, change "determining a one second process" to --determining a second process--.

Signed and Sealed this
Second Day of July, 2019

Andrei Iancu
*Director of the United States Patent and Trademark Office*